(No Model.) 6 Sheets—Sheet 1.
H. SYMINGTON.
MACHINERY FOR WELDING LAP JOINTED TUBES.
No. 550,203. Patented Nov. 19, 1895.
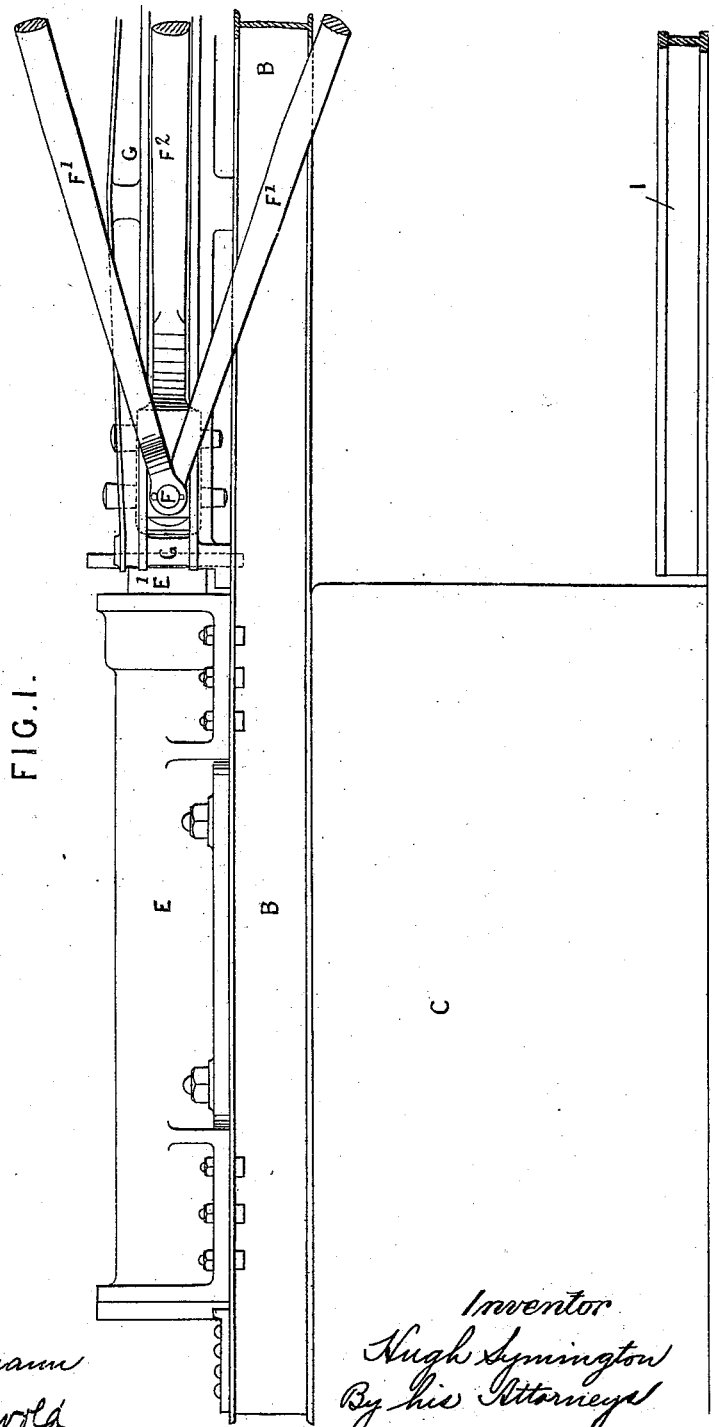
FIG.I.
Witnesses
George Baumann
E. J. Griswold
Inventor
Hugh Symington
By his Attorneys
Howson and Howson

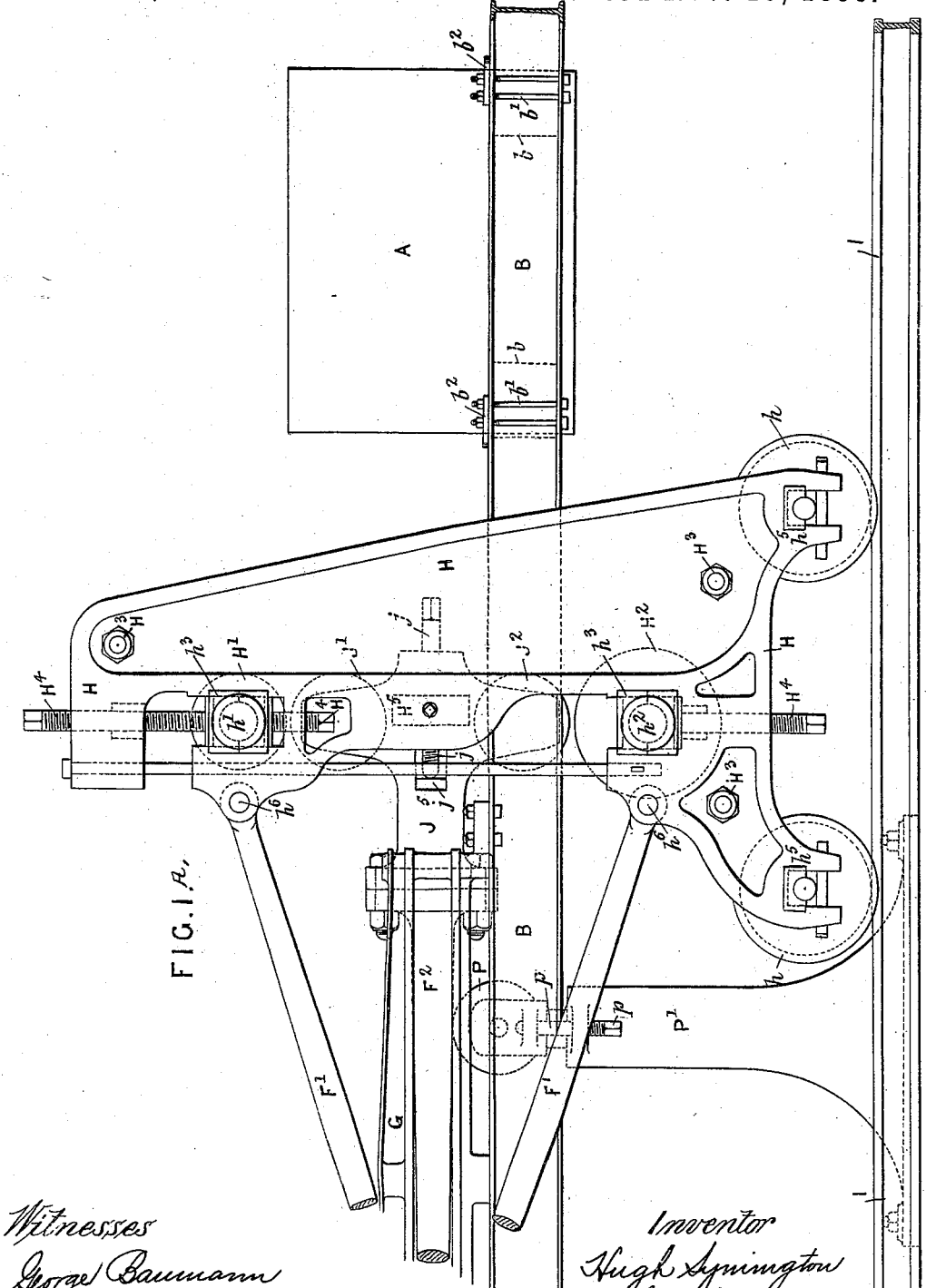

(No Model.) 6 Sheets—Sheet 3.
H. SYMINGTON.
MACHINERY FOR WELDING LAP JOINTED TUBES.
No. 550,203. Patented Nov. 19, 1895.
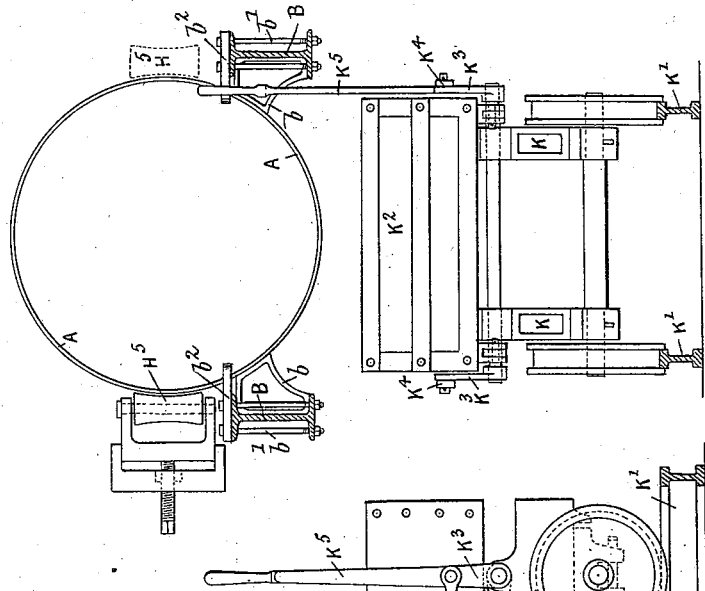
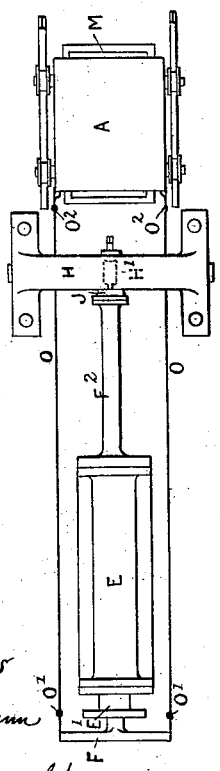
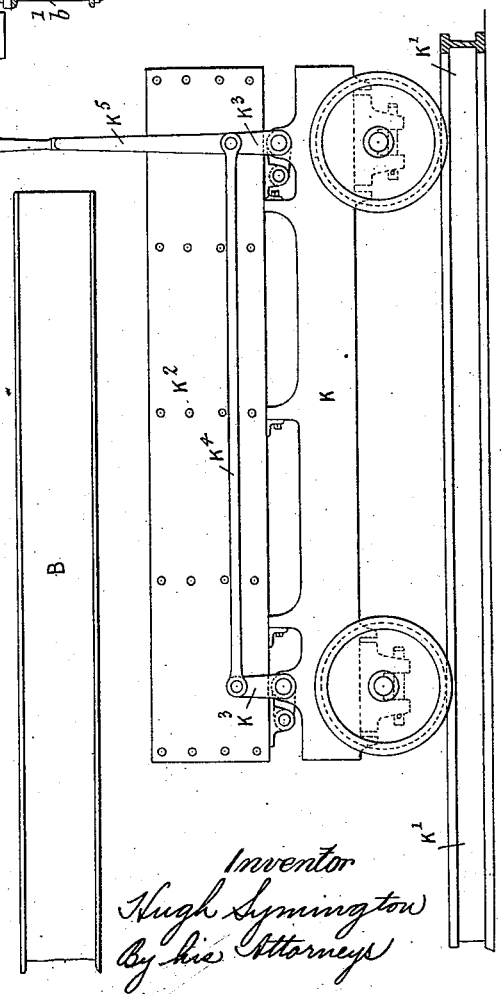

(No Model.) 6 Sheets—Sheet 4.
H. SYMINGTON.
MACHINERY FOR WELDING LAP JOINTED TUBES.
No. 550,203. Patented Nov. 19, 1895.

Witnesses
George Baumann
E. J. Griswold

Inventor
Hugh Symington
By his Attorneys
Howson and Howson

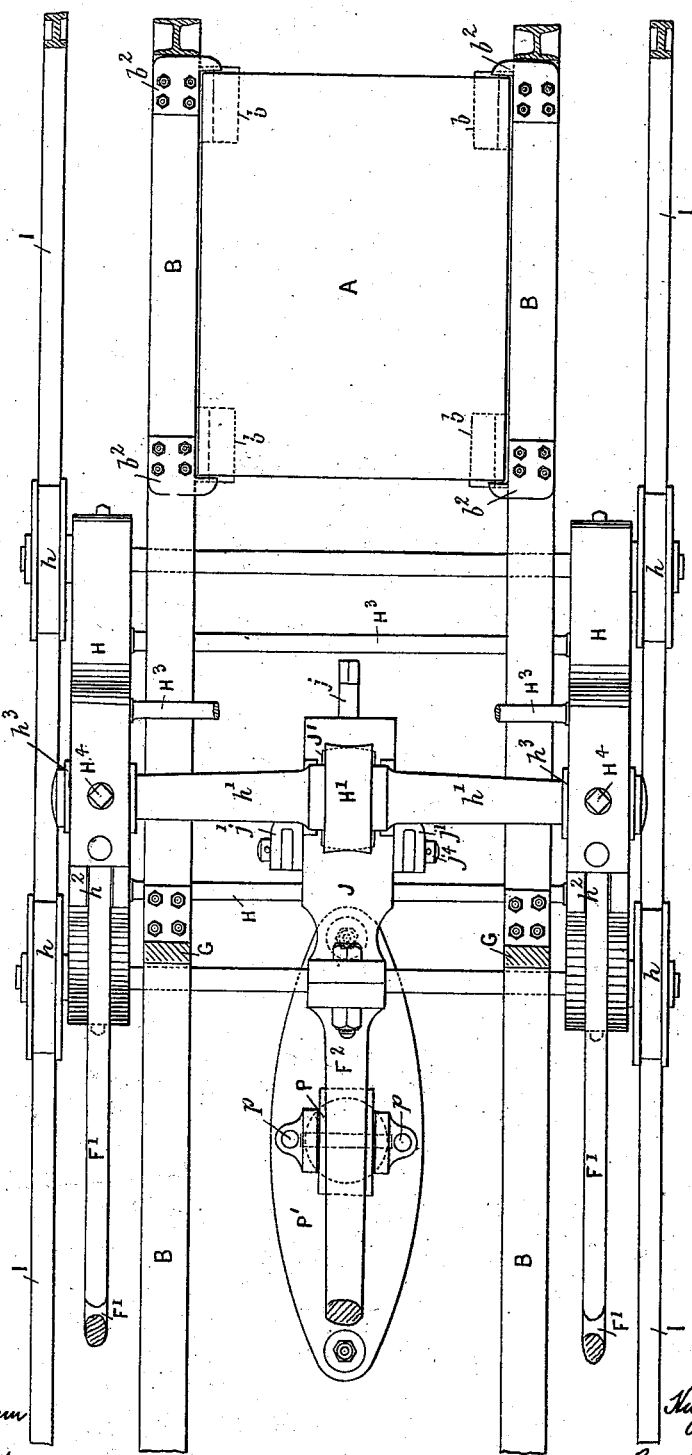

(No Model.)  6 Sheets—Sheet 6.
H. SYMINGTON.
MACHINERY FOR WELDING LAP JOINTED TUBES.
No. 550,203.  Patented Nov. 19, 1895.
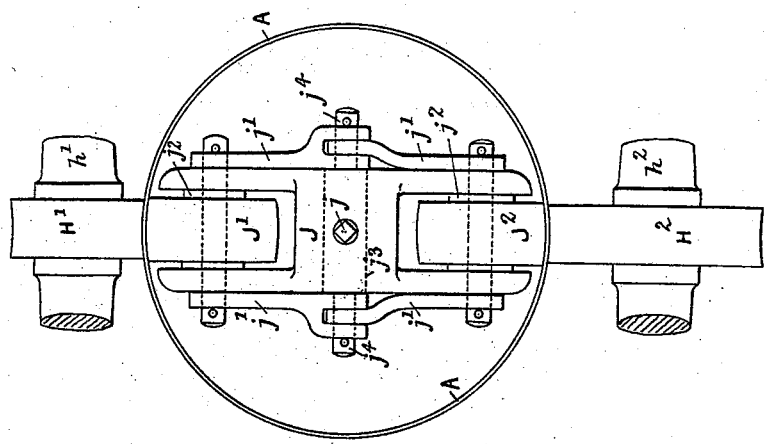
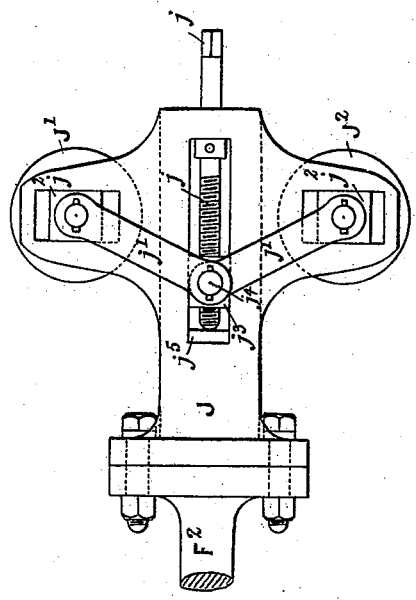

UNITED STATES PATENT OFFICE.

HUGH SYMINGTON, OF COUTBRIDGE, SCOTLAND.

MACHINERY FOR WELDING LAP-JOINTED TUBES.

SPECIFICATION forming part of Letters Patent No. 550,203, dated November 19, 1895.

Application filed January 7, 1895. Serial No. 534,157. (No model.)

*To all whom it may concern:*

Be it known that I, HUGH SYMINGTON, a subject of the Queen of Great Britain and Ireland, residing at Coutbridge, county of Lanark, Scotland, have invented Improved Machinery for Welding Lap-Jointed Tubes, of which the following is a specification.

My invention has reference to and comprises improvements in machinery for the manufacture of lap-welded tubes and in the construction and combination of the parts of a machine for welding the longitudinal joints of such, more particularly those of a large size, such as boiler-flues and the like; and it consists in the introduction into the tube to be welded of rolls—two or more—curved to the shape of the tube and the application to the outside of the tubes of rolls or pulleys, also curved to the shape of the tube, one of the rolls inside and one of the pulleys outside being opposite each other and in immediate contact with the lap edges of the tube, and their pressure upon one another effecting the weld. It is part of the arrangement that the lap joint is to be heated in position by a smokeless furnace, or by gas or otherwise, and that the rolls and the pulleys are to be moved together longitudinally along the weld either by mechanical force applied to them or by similar force applied to the tube while the rolls and pulleys are stationary.

In order to enable others skilled in the art to which my invention refers to understand how it may be carried into practice, I have hereunto appended six sheets of explanatory drawings, in which the same reference-letters are used to distinguish the same parts in all the figures where shown.

Figure 2:
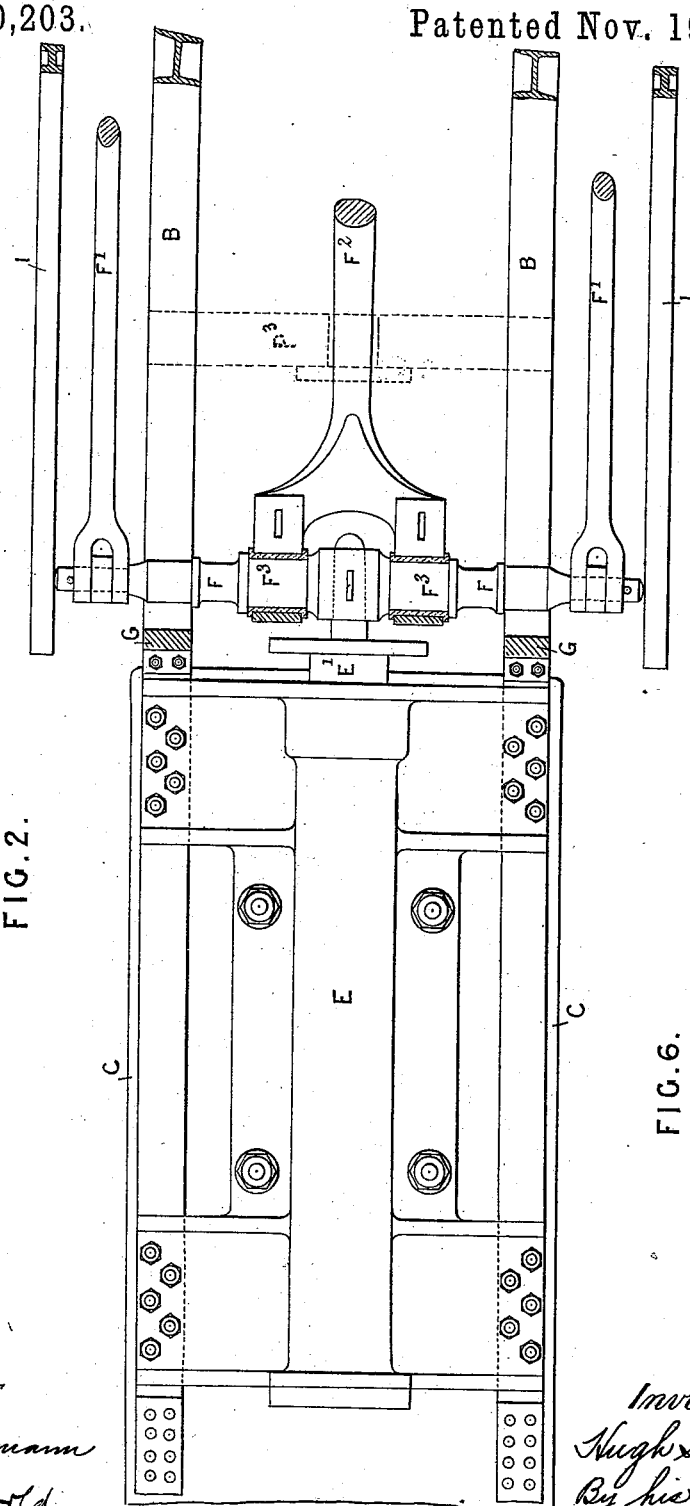
Figure 6:
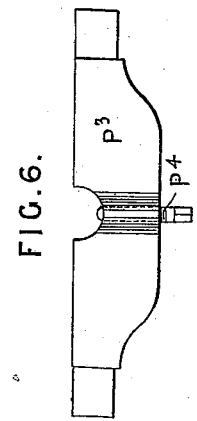

Figures 1, $1^a$, and $1^b$ on Sheets 1, 2, and 3 represent, when taken together, (the first two slightly overlapping,) a side elevation of a lap-joint-welding machine, shown for convenience of illustration as broken away into three divisions. Figs. 2 and $2^a$ on Sheets 4 and 5, when taken together, represent a plan view of the parts illustrated on Sheets 1 and 2. Fig. 3 on Sheet 3 is a cross-section of part of the machine, illustrating the method of securing the tubes to be operated on, the guide-rollers on each side of the tube, and the furnace in position below. Fig. 4 on Sheet 6 is a front view of the welding-rolls; and Fig. 5 is a side view of the inner rolls, showing the devices for adjusting their distance from one another. Fig. 6 on Sheet 4 shows a device for supporting the rod carrying the inner rolls in true horizontal line. Fig. 7 on Sheet 3 is a diagram plan of another arrangement of the parts of the machine, and Fig. 8 is a view of a gripping appliance for gripping the end of the tube to draw it through between the rolls.

According to the arrangement shown in Figs. 1 to 6, the tube A to be operated upon is placed on a pair of strong horizontal girders B, placed parallel and supported at one end by a strong built-up bed C, or it might be a metal frame, on which is securely bedded the double-acting hydraulic ram E E' to actuate the welding appliances to be described, while the other ends of the parallel girders B, of H-iron, are supported on columns or any suitable standard or erection with or without a free passage between said ends.

To support the tube A on the girders B, portable bracket-pieces $b$, Fig. 3, are secured on the inside of the girders B by screwed bolts $b'$, secured by nuts, so as to keep the tube A always in the center line of the machine, these brackets $b$ being formed of a shape and size to effect this and a series of holes being formed through the girders to receive the bolts $b'$. Catches $b^2$, placed at the ends of the tube A to prevent longitudinal movement, are also secured to the girders B by the same bolts $b'$ as secure the brackets $b$.

The welding is effected by rolls traversed along the joint of the tube while the latter is hot, and these would be fitted and actuated as follows: The actuating double-acting hydraulic ram E E', already referred to as bedded on an erection C at one end of the parallel girders B, is furnished with a long plunger or ram E', which is fitted in front with a cross-head F, which travels in slide-guides G on each side, resting on and secured to the girders B. This cross-head F is connected by strong stay-rods F' to a vertical traveling frame H, carrying upper and lower rolls H' $H^2$, so adjusted as to roll on the outside of the tube A, above and below, to afford resistance against pressure applied inside of the tube. These rolls H' $H^2$ rotate by their journals $h'$ $h^2$ in bush-bearings $h^3$, adjustably carried in housings in the side standards of the vertical traveling frame H, and these side standards are bound together by transverse stays H³, and screws H⁴ on each standard are used for adjusting the positions of the rolls H' H² to suit different sizes of tubes. These rolls H' H² are concave-shaped on the circumferential surface to fit the tube being operated upon and are so carried in their housings as to be easily removed for change when rolls of a different size and contour are required to be used.

On the outer end of a frame J, carried on a rod F², jointed at F³ to the cross-head F of the hydraulic ram E E', are carried upper and lower rolls J' J² at such a distance from the cylinder E as to be in vertical line with the before-mentioned rolls H' H², and the distance between these rolls J' J², which are convex-shaped on their circumferential surface to fit the inside of the tube operated upon, is adjusted by a screw $j$ actuating the toggle-links $j'$ by means of a sliding block $j^3$ with studs $j^4$ to press outward and draw inward the bush-bearings $j^2$ of the rolls J' J², a steel washer or block $j^5$ being interposed between the end of the screw $j$ and the frame to keep the screw in position and at same time sustain the pressure, all as shown in Figs. 4 and 5, Sheet 6.

A pulley P, Figs. 1ª and 2ª, is mounted on a block P', so as to be adjustable vertically by the screws $p$, and on this pulley P the connecting-rod F², made flat on its under surface, runs so as to be maintained in true line with the center of the tube to be operated upon. Otherwise the rod F² may be supported by a cross-bar sliding in the guides G, as indicated at P³, Fig. 2, and shown more particularly in Fig. 6, this cross-bar having an adjusting-screw P⁴ to adjust the rod F² in true line.

The vertical traveling frame H, traversed to and fro by the hydraulic ram E E', is mounted on wheels $h$, running on the rails I, and can be linked to a carriage K running on the same rails or on a pair of rails K' between these, carrying a long boiler-maker's furnace K², mounted on the carriage K by bell-crank levers K³, the pair on each side being connected by a rod K⁴ and actuated by the handle K⁵, this being a prolongation of one of the limbs of one of the bell-crank levers, all for the purpose of raising and lowering the furnace K², as desired. This furnace is to be fed with coke or other smokeless fuel; but a gas-furnace could be used instead for the purpose of heating the joint.

The appliances described are used as follows: The hydraulic ram E' and the vertical traveling frame H, connected to same, being drawn inward to their inmost position, a tube A would be secured on the parallel girders B with its unwelded joint downward and the furnace K² on its carriage K run under it to heat the joint and linked to the traveling frame H. When the joint is heated up to the desired degree, the ram E' is driven outward by hydraulic pressure and forces the traveling frame H and furnace K² along with it, while the hot joint is nipped between the lower roll H² outside and the lower roll J² inside of the tube, and is welded by the pressure, the tube being guided by the adjustable antifriction-rollers H⁵ on the inside of the frame-standards. The furnace K² would then be unlinked and drawn back along the rails and the frame H drawn inward by the ram E', so that the welded tube can be removed.

Though hydraulic power is stated as that to be used for operating the welding appliances, steam or other power, with suitable gearing, could be used.

According to another arrangement of the machine, as illustrated by the diagram plan view Fig. 7, Sheet 3, the tube to be welded would be mounted on a carriage, (indicated at M) traveling on rails instead of being fixed in place on side girders, which carriage would be fitted above with rollers or pulleys adjustable, by raising and lowering screws, to different heights, or by being mounted on bell-crank levers in a similar manner to the furnace described and shown in Fig. 1ᵇ. These pulleys would facilitate the running of the tube on or off the carriage, which would also be fitted with a longitudinal gas or other furnace for heating the tube along its length in the center. The joint in this case would be turned upward. In this arrangement the vertical frame H, carrying the outer welding rolls, would be securely fixed to a strong foundation, instead of running on rails, and the inner rolls, instead of being secured to a mandrel connected to the hydraulic ram, would be mounted on the end of a strong fixed projecting arm or rod, as indicated at F², which would also be fitted with adjustable guide-rolls on its upper side to receive the tube as it passes through the rolls in the process of welding. The double-acting ram E', working out from the far end of the cylinder E, would be used for drawing the heated tube between the welding-rolls, and for that purpose would be fitted with a cross-head F, carrying the rods O, having gripping appliances such as those shown by Fig. 8 at their outer ends to seize and securely hold the tube. These rods would be carried in guides and jointed, as indicated at O' O². Otherwise the hydraulic ram may be dispensed with and the outer rolls be worked by wheel-gearing and draw by friction the tube from off its carriage between the outer and inner welding-rolls in their revolution. In these machines the whole joint may be heated and welded at one operation or only a portion at a time, as may be desired.

What I claim is—

1. In a machine for welding the lap joints of curvilinear tubes, the combination of inner rolls adapted to bear against the opposite sides of the interior of the tube, and outer rolls adapted to bear on the outer side of the tube opposite the inner rolls, and frames for supporting the same, with a hydraulic ram and connecting rods between the piston of the ram and the said frames, substantially as set forth.

2. In a machine for welding the lap joints of tubes, the combination of inner rolls, and a hydraulic ram, with outer rolls, a frame for the said outer rolls, a traveling carriage provided with a furnace connected to the said frame, and connecting rods between the ram and the inner rolls and the frame, substantially as set forth.

3. In a machine for welding the lap joints of tubes, the combination of a hydraulic ram and girders to support the tube to be acted upon, with inner and outer rolls, frames supporting the same, and connecting rods between the hydraulic ram and the said frames, substantially as set forth.

4. In a machine for welding the lap joints of tubes, the combination of a hydraulic ram and girders to support the tube to be acted upon, with inner and outer rolls, frames for supporting the same, connecting rods between the hydraulic ram and the said frames, and a traveling carriage provided with heating means adapted to be linked to and move with the frames carrying the rolls, substantially as set forth.

5. In a machine for welding the lap joints of tubes, the combination of a hydraulic ram, girders to support the tube to be acted upon and means for adjusting the tube to the center line of the machine, with inner and outer rolls, frames for carrying the same, connecting rods between the hydraulic ram and the said frames and a traveling carriage provided with an adjustable furnace, substantially as set forth.

In testimony whereof I have signed my name to this specification in the presence of two subscribing witnesses.

HUGH SYMINGTON.

Witnesses:
R. C. THOMSON,
J. MACNAB.